United States Patent [19]

Ikeda et al.

[11] Patent Number: 4,792,907

[45] Date of Patent: Dec. 20, 1988

[54] VEHICLE NAVIGATION SYSTEM

[75] Inventors: Motozo Ikeda, Kariya; Hiroyasu Fukaya, Nagoya; Tomihisa Sakai, Aichi, all of Japan

[73] Assignee: Nippondenso Co., Ltd., Kariya, Japan

[21] Appl. No.: 108,911

[22] Filed: Oct. 15, 1987

[30] Foreign Application Priority Data

Nov. 17, 1986 [JP] Japan .................. 61-273747

[51] Int. Cl.$^4$ ............................. G06F 15/50
[52] U.S. Cl. .................... 364/449; 364/443; 73/178 R; 340/988; 340/990; 340/995
[58] Field of Search ............ 73/178 R; 364/449, 424, 364/457, 443, 444, 521; 340/988, 990, 995; 342/451

[56] References Cited

FOREIGN PATENT DOCUMENTS

| | | |
|---|---|---|
| 58-99715 | 6/1983 | Japan . |
| 58-113711 | 7/1983 | Japan . |
| 58-129313 | 8/1983 | Japan . |
| 58-216911 | 12/1983 | Japan . |
| 60-44821 | 3/1985 | Japan . |
| 61-8616 | 1/1986 | Japan . |
| 61-44316 | 3/1986 | Japan . |
| 61-209316 | 9/1986 | Japan . |

Primary Examiner—Gary Chin
Attorney, Agent, or Firm—Cushman, Darby & Cushman

[57] ABSTRACT

Traveling conditions of a vehicle are detected. A present position of the vehicle is calculated on the basis of the detected vehicle traveling conditions. A memory holds data representing preset reference points located at intersections and at unforked straight roads, data representing whether the respective preset reference points are located at the intersections or at the unforked straight roads, and other data. A target reference point toward which a vehicle is traveling is selected from the preset reference points. When the vehicle passes the target reference point, the calculated vehicle position is forcedly set to the target reference point. A decision is made as to whether or not the target reference point is located at an intersection or at an unforked straight road. A process of forcedly setting the calculated vehicle position to the target reference point located at the intersection is differentiated from a process of forcedly setting the calculated vehicle position to the target reference point located at the unforked straight road.

5 Claims, 5 Drawing Sheets

VEHICLE NAVIGATION SYSTEM

BACKGROUND OF THE INVENTION

1. Field of the Invention

This invention generally relates to a vehicle navigation system and specifically relates to a system including a display indicating the position of a vehicle on a map.

2. Description of the Prior Art

Some known vehicle navigation systems determine the position of a vehicle in accordance with the vehicle traveled distance and the vehicle travel direction derived through a vehicle speed sensor and a vehicle azimuth sensor. The determined vehicle position is generally indicated on a road map by a cathode-ray tube (CRT). Even small errors in the sensed vehicle speed and the sensed vehicle travel direction sometimes cause unacceptably inaccurate determination of the vehicle position.

There are various known ways of increasing the accuracy of a determined vehicle position in vehicle navigation systems.

SUMMARY OF THE INVENTION

It is an object of this invention to provide an accurate vehicle navigation system.

In a vehicle navigation system of this invention, traveling conditions of a vehicle are detected. A present position of the vehicle is calculated on the basis of the detected vehicle traveling conditions. A memory holds data representing preset reference points located at intersections and at unforked straight roads, data representing whether the respective preset reference points are located at the intersections or at the unforked straight roads, and data representing distances between the adjacent preset reference points. A target reference point toward which a vehicle is traveling is selected from the preset reference points. A decision is made as to whether or not the target reference point is located at an intersection or at an unforked straight road. In cases where the target reference point is located at an intersection, curvature of motion of the vehicle is detected while the calculated vehicle position remains in a check range around the target reference point. In cases where the target reference point is located at the intersection, the calculated vehicle position at which the detected curvature of motion of the vehicle is maximized is forcedly set to the target reference point. A device detects a distance traveled by the vehicle from a preceding reference point which the vehicle passed last. In cases where the target reference point is located at an unforked straight road, the calculated vehicle position at which the vehicle traveled distance equals a distance between the target reference point and the preceding reference point is forcedly set to the target reference point while the calculated vehicle position remains in a check range around the target reference point.

DESCRIPTION OF THE PREFERRED EMBODIMENT

Figure 1:
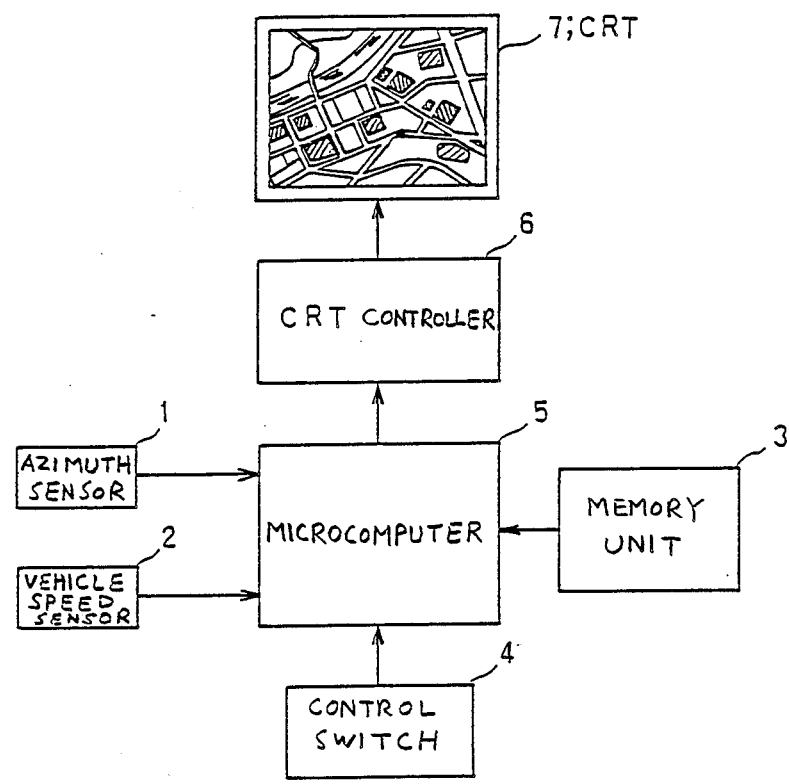
FIG. 1 is a block diagram of a vehicle navigation system according to an embodiment of this invention.

With reference to FIG. 1, a vehicle navigation system includes an azimuth sensor 1 detecting the course of a vehicle or the direction of travel of the vehicle. The direction of travel of the vehicle is referred to as the vehicle travel direction. For example, the azimuth sensor 1 is of the type, using the terrestrial magnetism to determine the vehicle travel direction. The azimuth sensor 1 may be of the type, including a gyrocompass. The azimuth sensor 1 may also be of the type, sensing the steering angle of the veiicle and accumulating the sensed steering angle to determine the vehicle travel direction. It should be noted that, for example, the steering angle of the vehicle is derived from the angular position of a steering wheel of the vehicle.

A vehicle speed sensor 2 detects the speed of the vehicle. The distance traveled by the vehicle can be determined through an accumulative or integral process of the detected vehicle speed. The distance traveled by the vehicle is referred to as the vehicle traveled distance.

A memory unit 3 of a large capacity holds data of a map and data of preset reference points in each of separate areas or regions. For example, the memory unit 3 is composed of a compact disc memory. The map data includes information related to the shapes of roads, the widths of the roads, the names of the roads, buildings, the names of places, and the natural configuration of each area. The reference points generally correspond to features of the roads. The reference point data are used in correcting a calculated and indicated vehicle position, a vehicle travel direction derived through the azimuth sensor 1, and a vehicle traveled distance derived through the vehicle speed sensor 2.

The roads are approximated by a combination of broken straight lines. The reference points are located at bends in unforked roads and intersections or forks of roads. In the case of a straight road which extends for more than a given distance without any fork or intersection, reference points are spaced at fixed intervals along the road. The reference point data include information related to the following items:

(1) the identification numbers of the reference points;
(2) the absolute positions (latitudes and longitudes) Pt of the reference points;
(3) the identification numbers of areas or regions containing the reference points;
(4) the angles (curvatures θ) formed by the lines meeting at the reference points;
(5) with regard to each of the reference points, the number "i" of the other reference points adjacently connected to the present reference point, where the number "i" is in the range of 1 to m;
(6) with regard to each of the reference points, the identification numbers of the other reference points adjacently connected to the present reference point;

(7) with regard to each of the reference points, the distances di between the present reference point and the other reference points adjacently connected to the present reference point; and (8) with regard to each of the reference points, the directions αi of the other reference points adjacently connected to the present reference point, the direction αi of the other reference points being determined relative to the present reference point.

As understood from the previous description, the reference point data include information related to whether the respective reference points are located at unforked straight roads or located at intersections and forks.

A control switch unit 4 includes various switches. The vehicle driver or passenger can input initial values and can select an indicated map by handling the switches.

A microcomputer 5 calculates a present position of the vehicle from the vehicle travel direction derived through the azimuth sensor 1, the vehicle speed derived through the vehicle speed sensor 2, and the initial values inputted through the control switch unit 4. The microcomputer 5 also fetches date of the selected map from the memory unit 3 in compliance with the map selection requirement performed via the control switch unit 4. The microcomputer 5 outputs a signal or signals representing the calculated vehicle position and the map. The micorcomputer 5 has a combination of a read-only memory (ROM), a random-access memory (RAM), a central processing unit (CPU), and an input/output (I/O) circuit.

The microcomputer 5 generally includes an integrator or accumulator which derives the vehicle traveled distance from the vehicle speed detected by the vehicle speed sensor 2. The integrator or accumulator is disposed within the I/O circuit of the mirocomputer 5. It is preferable that the integrator or accumulator is of the resettable type. In the case where the vehicle speed sensor 1 generates a pulse signal whose frequency is proportional to the vehicle speed, the integrator or accumulator preferably includes a counter whose input terminal is subjected to the pulses from the vehicle speed sensor 1.

A CRT (cathode-ray tube) controller 6 receives the output signal or signals from the microcomputer 5. This device 6 controls a CRT 7 in accordance with the signal or signals outputted by the microcomputer 5. The map represented by the output signal from the microcomputer 5 is reproduced on a screen of the CRT 7. The calculated vehicle position represented by the output signal from the microcomputer 5 is indicated on the map by the CRT 7.

In general, the devices 1-7 are mounted on the vehicle. It should be noted that the following modification may be made.

The modification includes a transmitter mounted on the vehicle which transmits data derived through the azimuth sensor 1 and the vehicle speed sensor 2 mounted on the vehicle. In this modification, a fixed station includes the combination of the devices 3-7, and a receiver catching the transmitted data and feeding them to the combination of the devices 3-7.

Figure 2:
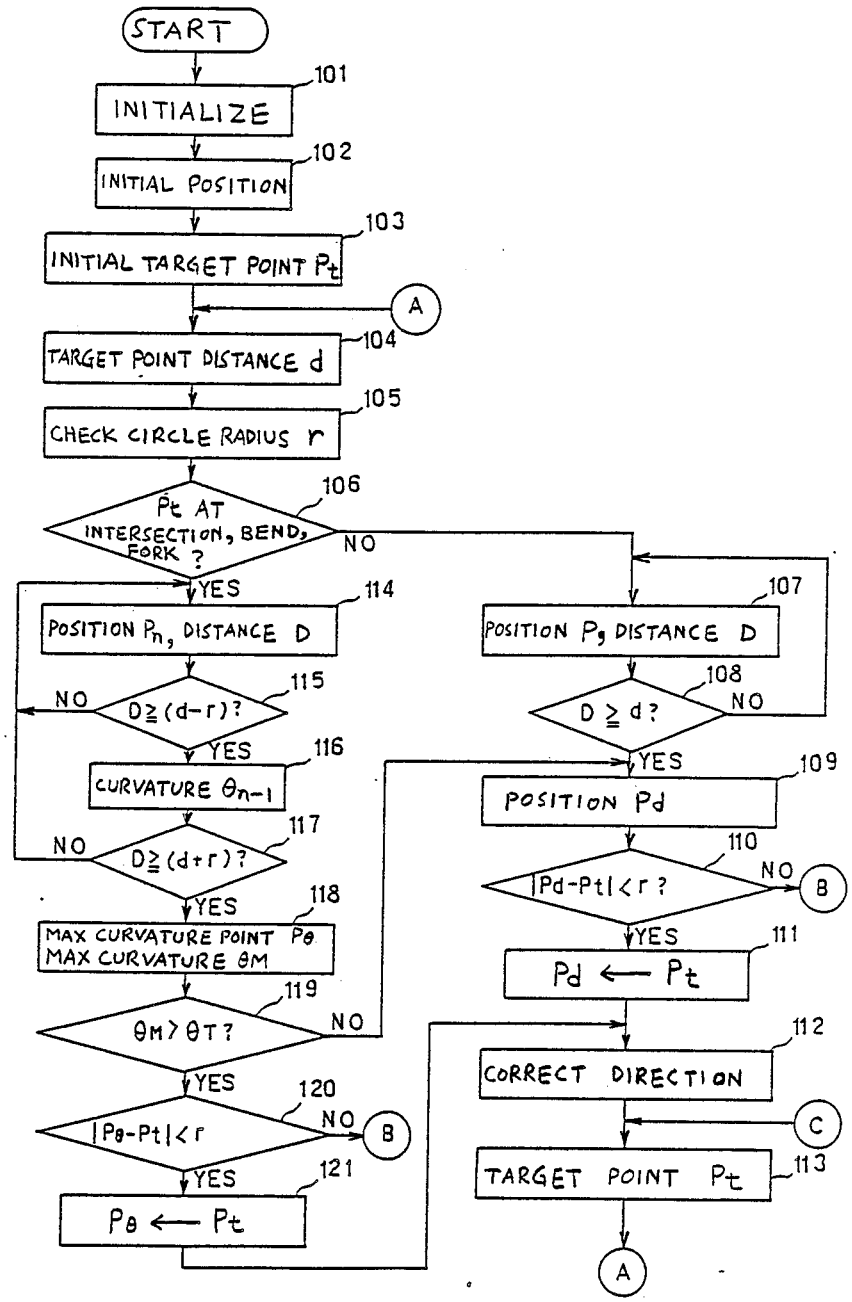
FIGS. 2 and 3 are a flowchart of a main routine of a program operating the microcomputer of FIG. 1.
Figure 3:
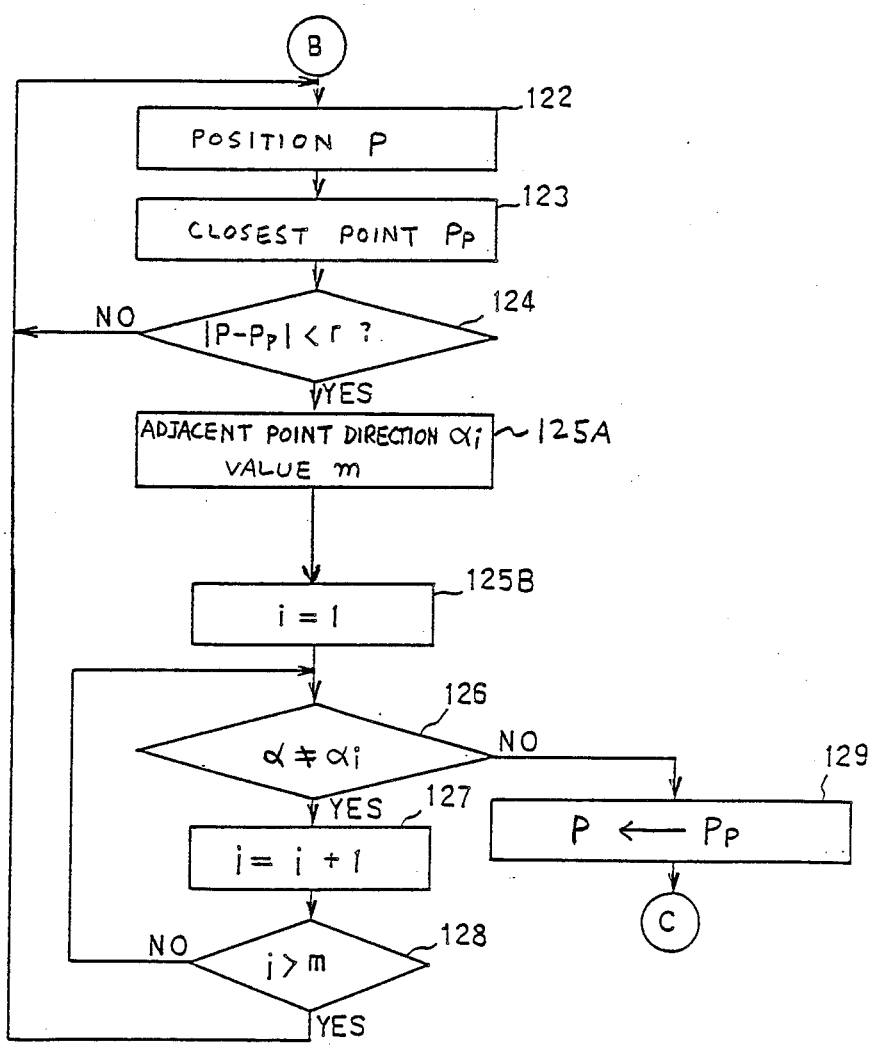

The microcomputer 5 operates in accordance with a program stored in the ROM. When a power supply switch (not shown) is turned to an ON position, the microcomputer 5 starts its programmed operation. When the power supply switch is turned to an OFF position, the microcomputer 5 stops its programmed operation. FIGS. 2 and 3 are a flowchart of a vehicle position calculation routine of the program which constitutes a main routine of the program.

As shown in FIG. 2, when the power supply switch is turned to its ON position, a first step 101 of the program initializes memories and registers within the microcomputer 5.

A step 102 following the step 101 derives or reads an initial position of the vehicle at the start of the vehicle. In general, the vehicle initial position is set by the vehicle passenger before the start of the vehicle. Specifically, the vehicle passenger handles the control switch unit 4 and thereby selects a map indicated by the CRT 7. Then, the vehicle passenger moves a cursor or light spot on the CRT 7 to a desired position in the map which corresponds to the current position of the vehicle. When the cursor reaches the desired position, the vehicle passenger handles the control switch unit 4 to order the microcomputer 5 to use the cursor position as the vehicle initial position.

It should be noted that a calculated vehicle position obtained at the stop of the vehicle may be used in the initial vehicle position at the following start of the vehicle. In this case, the calculated vehicle position obtained at the stop of the vehicle is stored in a nonvolatile memory.

A step 103 subsequent to the step 102 determines an initial target reference point Pt toward which the vehicle is moving. The initial target reference point Pt is selected from preset reference points stored in the memory unit 3. Specifically, the step 103 derives the current vehicle travel direction from a signal outputted by the azimuth sensor 1 and finds a reference point which is situated in the current vehicle travel direction and which is closest to the initial vehicle position. The found reference point is used as the initial target reference point Pt. After the step 103, the program advances to a step 104.

As will be made clear hereinafter, the step 104 is usually reiterated. In the first execution of the step 104, the distance "d" between the initial vehicle position and the initial target reference point Pt is calculated. In the second and later executions of the step 104, the distance "d" between a target reference point Pt and a preceding reference point which the vehicle passed last is calculated by referring to the reference point data stored in the memory unit 3. The distance "d" is referred to as the reference point distance.

Figure 6:
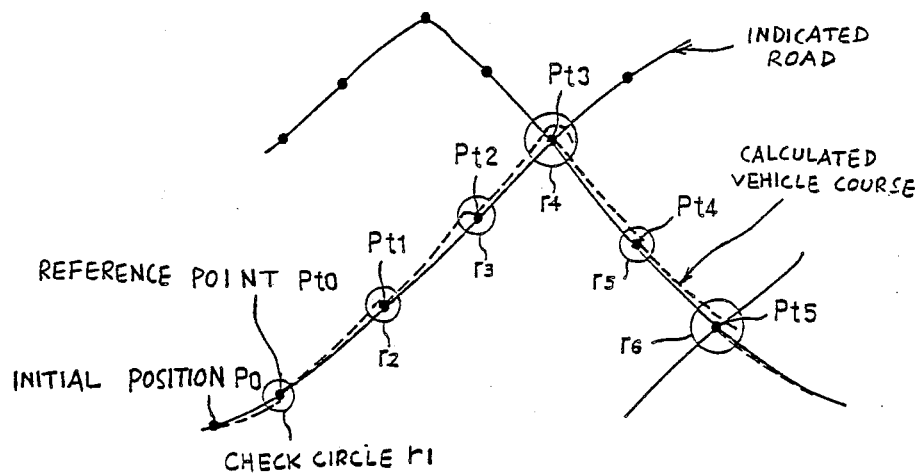
FIG. 6 is a diagram of roads, reference points check circles, and the course of travel of a vehicle.

A step 105 following the step 104 calculates the radius "r" of a check or test circle on the basis of the vehicle traveled distance. As shown in FIG. 6, the radius "r" of a check circle increases with the vehicle traveled distance. When the vehicle turns at a fork or intersection, or when the vehicle passes a bend, the vehicle traveled distance for determining hhe radius "r" of a check circle is reset and the vehicle speed accumulative calculation for determining the vehicle traveled distance is restarted. Specifically, the radius "r" of a check circle is calculated by referring to the following equation.

$$r = K1 \cdot dis + k2 \cdot \Sigma dis + r0$$

where the characters K1 and K2 denote preset constants; the constant K1 is greater than the constant K2; the character dis denotes the distance between reference points; the charccter Σdis denotes the distance between a reference point and an intersection (fork) or bend; and the character r0 denotes a preset intitial value corresponding to the radius of the smallest check circle.

A step 106 following the step 105 determines whether or not the target reference point Pt is located at either of an intersection, a fork, and a bend. In the first execution of the step 106, the target reference point Pt equals the initial target reference point determined in the previous step 103. When the target reference point Pt is not located at any of an intersection, a fork, and a bend, that is, when the target reference point Pt is located at an unforked straight road, the program advances to a step 107. When the target reference point Pt corresponds to an intersection, a fork, or a bend, the program advances to a step 114.

The step 107 calculates a vehicle position P and a vehicle traveled distance D through accumulative calculation starting from the initial vehicle position or from the last reference point which the vehicle passed. Thus, the calculated vehicle position P and the calculated vehicle traveled distance D are measured from the initial vehicle position or from the last reference point which the vehicle passed. The vehicle position P is determined in accordance with the vehicle travel direction and the vehicle traveled distance derived through the azimuth sensor 1 and the vehicle speed sensor 2 in a known way. The vehicle traveled distance D is determined in accordance with the vehicle speed detected by the vehicle speed sensor 2 in a known way.

A step 108 following the step 107 compares the vehicle traveled distance D and the reference point distance "d" determined in the steps 107 and 104 respectively. When the vehicle traveled distance D is smaller than the reference point distance "d", the program returns to the step 107. When the vehicle traveled distance D is equal to or greater than the reference point distance "d", the program advances to a step 109.

Until the vehicle traveled distance D reaches the reference point distance "d", the program continues to circulate through the loop of the steps 107 and 108. When the vehicle traveled distance D reaches the reference point distance "d", the program moves from the loop of the steps 107 and 108 to the step 109 which calculates a current vehicle position Pd from the vehicle travel direction and the vehicle traveled distance in a known way.

A step 110 following the step 109 determines whether or not the calculated vehicle position Pd determined in the step 109 resides within a check circle centered at the target reference point Pt. Specifically, the step 110 calculates the absolute value of the distance between the vehicle position Pd and the target reference point Pt and then compares the distance absolute value with the check circle radius "r". When the vehicle position Pd resides within the check circle, the program advances to a step 111. When the vehicle position Pd does not reside within the check circle, the program advances to a step 122 of FIG. 3.

The step 111 forcedly sets the vehicle position Pd to the target reference point Pt. In other words, the value of the variable Pd representing the current calculated vehicle position is replaced by the value of the target reference point Pt. Accordingly, when the vehicle traveled distance "D" equals the reference point distance "d" and when the calculated vehicle position Pd resides within the check circle, the calculated vehicle position Pd is forcedly set to the target reference point Pt which corresponds to the center of the check circle. In a later process, the vehicle position P is determined through accumulative calculation starting from the target reference point Pt. After the step 111, the program advances to a step 112.

The process in the steps 107–111 allows the calculated vehicle position Pd to be forcedly set to the target reference points Pt0, Pt1, Pt2, and Pt4 of FIG. 6.

The step 114 calculates a current vehicle position $P_n$ and a vehicle traveled distance D as in the step 107. After the step 114, the program advances to a step 115.

The step 115 compares the vehicle traveled distance D with the reference point distance "d" minus the check circle radius "r". When the vehicle traveled distance D is smaller than the reference point distance "d" minus the check circle radius "r", the program returns to the step 114. When the vehicle traveled distance D is equal to or greater than the reference point distance "d" minus the check circle radius "r", the program advances to a step 116.

Figure 7:
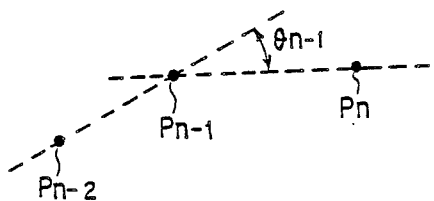
FIG. 7 is a diagram of calculated vehicle positions, lines connecting the calculated vehicle positions, and an angle formed between the lines.

The step 116 calculates a curvature $\theta_{n-1}$ at the calculated vehicle position $P_{n-1}$ which was determined by the execution of the step 114 immediately preceding the latest execution of the step 114. Specifically, the curvature $\theta_{n-1}$ is calculated from the vehicle positions $P_n$, $P_{n-1}$, and $P_{n-2}$ which were determined by the latest execution of the step 114, the execution of the step 114 immediately preceding the latest execution of the step 114, and the execution of the step 114 immediately preceding the execution of the step 114 determining the vehicle position $P_{n-1}$, respectively. In more detail, as shown in FIG. 7, the curvature $\theta_{n-1}$ is equal to the angle formed between the straight line connecting the vehicle positions $P_{n-2}$ and $P_{n-1}$, and the straight line connecting the vehicle positions $P_{n-1}$ and $P_n$.

A step 117 following the step 116 compares the vehicle traveled distance D with the reference point distance "d" plus the check circle radius "r". When the vehicle traveled distance D is smaller than the reference point distance "d" plus the check circle radius "r", the program returns to the step 114. When the vehicle traveled distance D is equal to or greater than the reference point distance "d" plus the check circle radius "r", the program advances to a step 118.

When the vehicle traveled distance D remains equal to or greater tha the value "d−r" but smaller than the value "d+r", the program continues to circulate through the loop of the steps 114–117 so that the curvature $\theta_{n-1}$ calculated repeatedly by the step 116. When the vehicle traveled distance D reaches the value "d+r", the program moves from the loop of the steps 114–117 to the step 118 which determines a maximal curvature $\theta M$ equal to the largest of the curvatures $\theta_{n-1}$ obtained by the reiteration of the step 116. The step 118 also determines a maximal curvature point $P\theta$ equal to the vehicle position $P_{n-1}$ at which the maximal curvature $\theta M$ occurs.

A step 119 following the step 118 compares the maximal curvature $\theta M$ with a predetermined value $\theta T$ to determine whether or not the vehicle has past essentially straight through an intersection (fork) or to determine whether or not the vehicle has past through a bend along a course of a small curvature. For example, the predetermined value $\theta T$ is equal to an angle of 20°. When the maximal curvature $\theta M$ is equal to or smaller than the predetermined value $\theta T$, that is, when the vehicle has past essentially straight through an intersection (fork) or when the vehicle has past through a bend along a course of a small curvature, the program advances to the step 109 so that a process similar to the process in the case of vehicle travel along an unforked straight road is performed. When the maximal curvature θM is greater than the predetermined value θT, that is, when the vehicle has turned appreciably at an intersection (fork) or a bend, the program advances to a step 120.

The 120 determines whether or not the maximal curvature point Pθ resides within the check circle centered at the target reference point Pt. Specifically, the step 120 calculates the absolute value of the distance between the maximal curvature point Pθ and the target reference point Pt and then compares the distance absolute value with the check circle radius "r". When the maximal curvature point Pθ resides within the check circle, the program advances to a step 121. When the maximal curvature point Pθ does not reside within the check circle, the program advances to the step 122 of FIG. 3.

The step 121 forcedly sets the maximal curvature point Pθ to the target reference point Pt. In other words, the value of the variable Pθ representing the maximal curvature point is replaced by the value of the target reference point Pt. Accordingly, when the maximal curvature point Pθ resides within the check circee, the maximal curvature point Pθ is forcedly set to the target reference point Pt which corresponds to the center of the check circle. In a later process, the vehicle position P is determined through accumulative calculation starting from the target refeeence point Pt. After the step 121, the program advances to the step 112.

The process in the steps 114–121 allows the calculated vehicle position Pd to be forcedly set to the target reference points Pt3 and Pt5 of FIG. 6.

The step 112 corrects the vehicle travel direction detected by the azimuth sensor 1. This correction is performed in view of the following error factors. In the case of an azimuth sensor 1 using the terrestrial magnetism, a declination of the terrestrial magnetic field and a magnetization of the vehicle body cause small errors in the detected vehicle travel direction. In the case of an azimuth sensor 1 incldding a gyrocompass or using the vehicle steering angle, a relative direction is determined so that errors in the detected vehicle travel direction are gradually accumulated.

Figure 8:
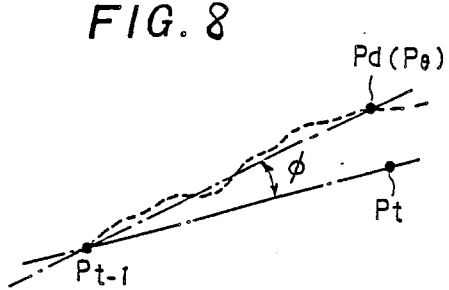
FIG. 8 is a diagram of reference points, a calculated vehicle position, lines connecting the reference points and the calculated vehicle position, and an angle formed between the lines.

As shown in FIG. 8, the step 112 calculates an angle φ formed between the straight line connecting the target reference point Pt and the immediately-preceding reference point Pt-1, and the straight line connecting the reference point Pt-1 and the calculated vehicle position Pd or Pθ to be forcedly set to the target reference point Pt in the step 111 or 121. Then, the vehicle travel direction α detected by the azimuth sensor 1 is corrected in accordance with the calculated angle φ. Accordingly, in a later process, corrected vehicle travel directions are used in calculating present vehicle positions. After the step 112, the program advances to a step 113.

The step 113 determines the next target reference point Pt. In the case where the present target reference point corresponds to a location different from an intersection (fork), the next target reference point Pt is easily determined by referring to the reference point data stored in the memory unit 3.

In the case where the present target reference point corresponds to an intersection (fork), the next target reference point Pt is determined as follows. Firstly, the reference points adjacently connected to the present target reference point are found by referring to the reference point data stored in the memory unit 3. Secondly, the reference point closest to the present target reference point is selected from the reference points adjacently connected to the present target reference point. Thirdly, the distance dmin between the present target reference point and the closest reference point is calculated. Then, the vehicle position P is calculated when the vehicle traveled distance D equals a value "dmin/2". The straight line connecting the present target reference point and the calculated vehicle position P is determined. The direction of the determined straight line is calculated. The directions of the reference points adjacently connected to the present target reference point are determined by referring to the reference point data. The direction of the straight line is compared with the directions of the reference points, thereby determining or selecting the reference point whose direction is closest to the direction of the straight line. Finally, the determined or selected reference point is set and used as the next target reference point Pt. After the step 113, the program returns to the step 104.

Steps of FIG. 3 are generally executed when the vehicle travels along a road omitted from the map data stored in the memory unit 3 or moves in a place outside roads. With reference to FIG. 3, the step 122 calculates the vehicle position P as in the step 107 of FIG. 2.

A step 123 following the step 122 determines the reference point Pp closest to the calculated vehicle position P by referring to the reference point data stored in the memory unit 3.

A step 124 following the step 123 determines whether or not the calculated vehicle position P resides within the check circle centered at the reference point $P_p$ determined in the previous step 123. Specifically, the step 124 calculates the absolute value of the distance between the vehicle position P and the reference point $P_p$ and then compares the distance absolute value with the check circle radius "r". When the vehicle position P resides within the check circle, the program advances to a step 125A. When the vehicle position P does not reside within the check circle, the poogram returns to the step 122.

The step 125A finds the reference points Pi adjacently connected to the reference point $P_p$ and determines the directions αi of the found reference points Pi by referring to the reference point data stored in the memory unit 3. The step 125A also sets the variable "m" to the number of the reference points Pi. It should be noted that the variable "i" = 1, 2, . . . , m.

A step 125B subsequent to the step 125A sets the variable "i" to 1. After the step 125B, the program advances to a step 126.

The step 126 compares the vehicle travel direction α with the direction αi of the reference point Pi. When the vehicle travel direction α differs the reference point direction αi, the program advances to a step 127. When the vehicle travel direction α equals the reference point direction αi, the program advances to a step 129.

The step 127 increments the value "i" by 1 according to the statement "$i = i + 1$". After the step 127, the program advances to a step 128.

The step 128 compares the value "i" with the value "m". When the value "i" is equal to or smaller than the value "m", the program returns to the step 126. When the value "i" is greater than the value "m", the program returns to the step 122.

Accordingly, when the vehicle travel direction α equals one of the reference point directions αi, the program moves from the loop of the steps 126-128 to the step 129. When the vehicle travel direction α differs from any of the reference point directions αi, the program returns from the loop of the steps 126-128 to the step 122.

In the step 129, the calculated veiicle position P determind by the previous step 122 is forcedly set to the reference point $P_p$. After the step 129, the program returns to the step 113 of FIG. 2.

Figure 4:
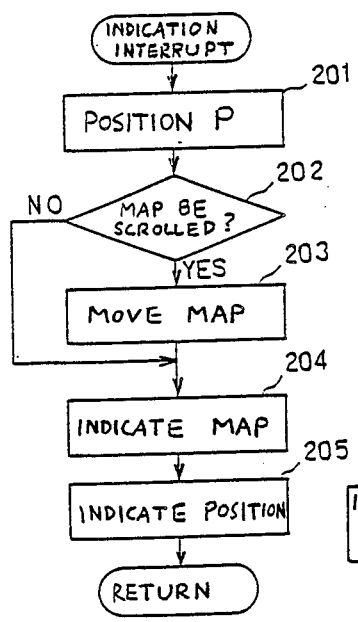
FIG. 4 is a flowchart of an indication subroutine of the program.

FIG. 4 is a flowchart of an indication subroutine of the program which is periodically reiterated at regular intervals by a timer-based interruption process. This indication routine controls the signal or signals outputted to the CRT controller 6. As shown in FIG. 4, a first step 201 of the indicatoon subroutine calculates the current vehicle position P or fetches the calculated vehicle position P determined in the main routine of FIGS. 2 and 3. A step 202 following the step 201 determines whether or not the map should be scrolled. When the map should be scrolled, the program advances to a step 203. When the map should not be scrolled, the program jumps to a step 204. The step 203 moves or changes the map. The step 204 allows the map to be indicated on the CRT 7. A step 205 following the step 204 allows the calculated vehicle point P to be indicated on the map by the CRT 7. After the step 205, the program returns to the main routine.

Figure 5:
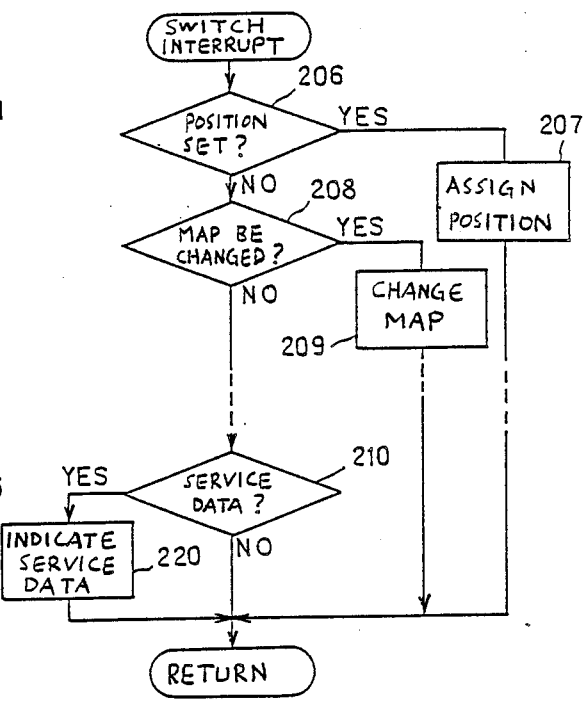
FIG. 5 is a flowchart of a switch subroutine of the program.

FIG. 5 is a flowchart of a switch subroutine of the program which is started by an interruption process when the control switch unit 4 is handled. As shown in FIG. 5, a first step 206 of the switch subroutine determines whether or not a vehicle position is set. When the vehicle position is not set, the program advances to a step 208. When the vehicle position is set, the program advances to a step 207 in which the vehicle position is assigned. After the step 207, the program returns to the main routine. The step 208 determines whether or not the map is required to be changed. When the map change is not required, the program advances to a step 210. When the map change is required, the program advances to a step 209 which replaces the map by a new map. After the step 209, the program returns to the main routine. The step 210 determines whether or not service data are required. When the service data are not required, the program returns to the main routine. When the service data are required, the program advances to a step 220 which allows the service data to be indicated on the CRT 7. The service data are supplied from the memory unit 3. After the step 220, the program returns to the main routine. It should be noted that other decision steps related to the function of the control switch unit 4 may be added between the steps 208 and 210.

As is understood from the previous description, the calculated vehicle position P is forcedly set to the target reference point Pt when the vehicle traveled distance D equals the reference point distance "d" and when the calculated vehicle position P resides within the check circle centered at the target reference point Pt. The calculated vehicle position P is not set to the target reference point Pt when the vehicle traveled distance D differs from the reference point distance "d" or when the calculated vehicle position P resides outside the check circle centered at the target reference point Pt. Accordingly, when the vehicle travels along a road omitted from the map data stored in the memory unit 3 or moves in a place outside roads, the calculated vehicle position is prevented from being set to the target reference point so that accurate navigation is enabled. It should be noted that when the vehicle travels along a road omitted from the map data stored in the memory unit 3 or moves in a place outside roads, setting the calculated vehicle position to the target reference point causes an error in the calculated vehicle position.

Each time the calculated vehicle position is forcedly set to the target reference point, the vehicle travel direction α detected by the azimuth sensor 1 is corrected in accordance with the error angle φ by the step 112 of FIG. 2. The later calculation of the vehicle position uses the corrected vehicle travel direction so that an error in the azimuth sensor 1 is prevented from accumulating during the vehicle position calculation.

In the case where the target reference point Pt corresponds to an intersection or a fork, the maximal curvature θM is determined by the step 118 of FIG. 2 while the vehicle traveled distance D remains within a longitudinal range centered at an end of the reference point distance "d" and having a length twice the check circle radius "r". When the maximal curvature θM is greater than the predetermined value θT and when the calculated vehicle position P at which the maximal curvature θM occurs resides within the check circle, the calculated vehicle position is forcedly set to the target reference point. Accordingly, an intersection or a fork can be precisely detected, thereby improving the accuracy in forcedly setting the calculated vehicle position to the target reference point.

What is claimed is:
1. A vehicle navigation system comprising:
(a) means for detecting traveling conditions of a vehicle;
(b) means for calculating a present position of the vehicle on the basis of the detected vehicle traveling conditions;
(c) means for holding data representing preset reference points located at intersections and at unforked straight roads, data representing whether the respective preset reference points are located at the intersections or at the unforked straight roads, and data representing distances between the adjacent preset reference points;
(d) means for determining a target reference point toward which a vehicle is traveling, the target reference point being selected from the preset reference points;
(e) means for determining whether or not the target reference point is located at an intersection or at an unforked straight road;
(f) means for, in cases where the target reference point is located at an intersection, detecting curvature of motion of the vehicle while the calculated vehicle position remains in a check range around the target reference point;
(g) means for, in cases where the target reference point is located at the intersection, forcedly setting the calculated vehicle position, at which the detected curvature of motion of the vehicle is maximized, to the target reference point;
(h) means for detecting a distance traveled by the vehicle from a preceding reference point which the vehicle passed last; and
(i) means for, in cases where the target reference point is located at an unforked straight road, forcedly setting the calculated vehicle position, at which the vehicle traveled distance equals a distance between the target reference point and the preceding reference point, to the target reference point while the calculated vehicle position remains in said check range around the target reference point.

2. The vehicle navigation system of claim 1 further comprising means for determining whether or not the vehicle has just passed straight the target reference point located at the intersection, and means for, in cases where the vehicle has just passed straight the target reference point located at the intersection, forcedly setting the calculated vehicle position, at which the vehicle traveled distance equals a distance between the target reference point and the preceding reference point, to the target reference point while the calculated vehicle position remains in said check range around the target reference point.

3. The vehicle navigation system of claim 1 wherein the vehicle traveling conditions detecting means comprises an azimuth sensor detecting a direction of travel of the vehicle, and further comprising means for correcting the detected vehicle travel direction in accordance with a positional relationship among the preceding reference point, the target reference point, and the calculated vehicle position occurring immediately before being set to the target reference point.

4. The vehicle navigation system of claim 1 further comprising means for varying said check range in accordance with the distance between the preceding reference point and the target reference point.

5. The vehicle navigation system of claim 1 wherein the target reference point determining means comprises:
 (a) means for selecting a reference point from the preset reference points which is closest to the preceding reference point which the vehicle passed last;
 (b) means for determining a direction of the calculated vehicle position with respect to the preceding reference point when the calculated vehicle position equals a value which depends on a distance between the preceding reference point and the closest reference point;
 (c) means for selecting a second reference point, from the preset reference points adjacent to the preceding reference point, whose direction is closest to the direction of the calculated vehicle position; and
 (d) means for setting and using the selected second reference point as the target reference point.

* * * * *